(12) United States Patent
Doyle

(10) Patent No.: US 6,688,608 B2
(45) Date of Patent: *Feb. 10, 2004

(54) RING SEAL

(76) Inventor: Michael Doyle, 10001 Timothy La., Villa Park, CA (US) 92681

( * ) Notice: Subject to any disclaimer, the term of this patent is extended or adjusted under 35 U.S.C. 154(b) by 0 days.

This patent is subject to a terminal disclaimer.

(21) Appl. No.: 10/096,466

(22) Filed: Mar. 11, 2002

(65) Prior Publication Data

US 2002/0130473 A1 Sep. 19, 2002

Related U.S. Application Data

(62) Division of application No. 09/574,822, filed on May 19, 2000, now Pat. No. 6,357,760.

(51) Int. Cl.[7] ............................................. F16L 21/025
(52) U.S. Cl. ...................... 277/604; 277/602; 277/608; 277/612
(58) Field of Search ................................ 277/602, 604, 277/608, 612, 626, 584

(56) References Cited

U.S. PATENT DOCUMENTS 3,188,100 A * 6/1965 Delgado ..................... 277/647
6,357,759 B1 * 3/2002 Azuma et al. ............... 277/602
6,357,760 B1 * 3/2002 Doyle ......................... 277/604

* cited by examiner

Primary Examiner—Anthony Knight
Assistant Examiner—E Peavey
(74) Attorney, Agent, or Firm—Drummond & Duckworth

(57) ABSTRACT

The improved ring seal includes an annularly shaped body element having a radial inner surface, a radial outer surface, a first axial end surface and a second axial end surface. The ring seal also includes a plurality of bores which project radially inward from the radial outer surface toward the radial inner surface. The projection of the bores through the ring seal form sidewalls which project between the axial end surfaces and radially from the ring seal's radial outer surface towards the ring seal's radial inner surface. The addition of the bores to the ring seal increases the ring seal's deformation during sealing compression, while the sidewalls provide elastic recovery of the ring seal during repeated cycles of compression and decompression. The ring seal also includes a circular ridge axially projecting from both axial end surfaces. The axial ridges separate the end surfaces into inner axial end surfaces and outer axial end surfaces. The inner axial end surfaces are recessed relative to the outer axial end surfaces such that the thickness of the ring seal as measured at the inner axial end surfaces is thinner than as measured at the outer axial end surfaces.

3 Claims, 4 Drawing Sheets dimensions, and make the seal prone to failure during compression.

RING SEAL

This application is a divisional application of co-pending U.S. application Ser. No. 09/574,822, filed May 19, 2000 now U.S. Pat. No. 6,357,760.

BACKGROUND OF THE INVENTION

The present invention relates to seals, often referred to as gaskets, for making a fluid or gas tight sealed joint between opposed parallel surfaces.

More particularly, the present invention relates to metal seals which provide plastic deformation to achieve extraordinarily low leak rates between substantially planar parallel surfaces.

A commonly used sealing ring is circular and has a radial cross-section of a "C" shape. These "C seals" are constructed both with the open side of the C construction facing the center of the ring such as described in U.S. Pat. No. 5,354,072, and with the open side of the C facing away from the center of the ring. As two parallel surfaces are brought together with the C seal in the middle, the C seal is compressed with the open side of the C cross-section closing during compression. The ductile properties of the seal permit plastic deformation to occur without damaging the mating surface. To increase the elastic recovery of the seal, some C seals are provided with a circular elastic helical spring concentrically located within the center of the seal which also alters the compression resistance and elasticity properties to that desired for particular sealing assemblies. Unfortunately, it is relatively complicated to manufacture a C seal having an internal helical spring resulting in the construction of acceptable seals being typically non-repeatable.

Some C seals are provided with a circular ridge, also referred to in the art as a "delta", formed on the surfaces that come in contact with the opposed parallel surfaces which are intended to be sealed. These ridges lessen the initial contact area between the seal and the parallel opposing surfaces thereby requiring less load to plastically deform the seal to accommodate minor distortions in the parallel surfaces. Unfortunately, C seals with these circular ridges often form a chamber between the circular ridge and the outer surface of the C seal as the seal is compressed. Though this seal may be leakproof, or have a leak of a sufficiently low value as to be within tolerances, a "virtual leak" is created if there is a leak between this cylindrical chamber and the interior passage of the seal, thereby permitting gases or liquids to flow slowly therebetween. Though a leakproof seal is in effect, testing of the seal may erroneously and undesirably reflect that a leak exists, and this condition is therefore referred to as a "virtual leak".

An additional seal which has been available is often referred to as a "V seal" which is also circular but instead of having a "C" cross-section, the V seal has a V cross-section with the low point of the V constructed to point either inwardly or outwardly towards the center of the seal. Though this construction typically provides for sufficient deformation, the V seal does not typically provide particularly good elastic recovery or repeatability as the point of the V seal forms a stress raiser concentrating the compression loads and making the seal prone to failure upon repeated compressions and decompressions of the seal.

Additional seals in the art include "Z seals" and simple "O rings". However, each of these seals also suffer for significant disadvantages.

It would thus be desirable to provide an improved ring seal for providing a sealed joint between axially opposed parallel surfaces which has a high degree of resilience, also known as rebound. More particularly, it would be desirable that the ring seal substantially return to its original dimensions after having undergone release from a predetermined compressive force.

It would also be desirable to provide an improved ring seal which can undergo a substantial amount of cycles of compression and decompression and thereafter still provide a substantially leakproof seal.

Moreover, it would be desirable to provide an improved ring seal which is not prone to exhibiting a virtual leak.

In addition, it would be desirable to provide a ring seal for universal applications which can thus be constructed in a variety of sizes and dimensions.

SUMMARY OF THE INVENTION

The present invention addresses the aforementioned disadvantages by providing an improved ring seal. The ring seal, similar to previous ring seals, includes an annular shaped body element having an axially aligned hole for gas or fluid passage. The ring seal also includes a radial inner surface, radial outer surface and first and second axially end surfaces which are intended to engage the opposing parallel surfaces between which the sealing joint is intended to be located.

The ring seal of the present invention further includes a plurality of bores projecting inwardly from the ring seal's radial outer surface toward the ring seal's center. The formation of the bores creates a plurality of sidewalls extending radially the length of the bore and axially between the ring seal's axial end surfaces. The plurality of bores may take any number of configurations. For example, preferably the bores are constructed by drilling radially from the ring seal's radial outer surface toward the ring seal's center to minimize costs and reduce any difficulties in manufacturing. Bores constructed in this manner have a circular cross-section. However, the bores may also be substantially rectangular in configuration forming substantially planar sidewalls extending axially between the ring seal's axial end surfaces and radially between the ring seal's inner and outer radial surfaces. In an alternative preferred embodiment, these planar sidewalls are constructed at an angle with respect to the axis of the ring seal, thus forming openings on the ring seal's radial outer surface in the form of a parallelogram.

For simplicity, the bores will primarily be described herein as having a circular cross-section though the bores may have cross-sections of other shapes without departing from the spirit or scope of the invention. The number of bores and their diameter may vary depending on the desired mechanical properties of the sealing assembly. For example, an increase in the number of bores or increase in the diameter of the bores causes a corresponding decrease in the thickness of the ring seal's internal sidewalls which will alter the mechanical characteristics of the seal, including increasing the seal's ability to deform. However, this increase in the number of bores or increase in the bores' diameter may diminish the elastic recovery (rebound) of the seal after compression and decompression. In a preferred embodiment, the bores are cylindrical and have diameters of between 25% and 75% of the thickness of the ring seal. Diameters less than 25% will significantly reduce the ring seal's ability to elastically deform. Meanwhile, increasing the diameter of the bores beyond 75% of the thickness of the ring seal will weaken the structural integrity of the seal and make the seal prone to failure during compression. In a preferred embodiment of the invention, the bores have a diameter of approximately 50% of the thickness of the ring seal.

In a preferred embodiment, the ring seal includes between ten and one hundred fifty bores, thereby forming a corresponding ten to one hundred fifty radially extending sidewalls constructed between the axial end surfaces. In an even more preferred embodiment, the ring seal of the present invention includes between twenty and thirty bores, thereby forming a corresponding twenty to thirty radially and axially extending sidewalls.

The ring seal of the present invention also includes circular ridges which project axially from the axial end surfaces. These circular ridges, also referred to as "deltas" by those skilled in the art, divide the axial end surfaces into inner axial end surfaces and outer axial end surfaces, with the respective inner axial end surfaces being concentrically located within the outer axial end surfaces and thus closer to the ring seal's center. Of importance, the inner axial end surfaces are offset axially with respect to the outer axial end surfaces. More particularly, the inner axial end surfaces are recessed with respect to the outer axial end surfaces such that the thickness of the ring seal measured at the inner axial end surfaces is thinner than the thickness of the ring seal as measured at the outer axial end surfaces. Providing offset axial end surfaces eliminates the seal's propensity to form a virtual leak by impeding the ability of the inner axial end surfaces to engage the opposed parallel surfaces during compression.

It is thus an object of the present invention to provide very repeatable, high quality, inexpensive and reliable ring seals for providing a seal between two planar surfaces.

It is an additional object of the present invention to provide a ring seal which provides significant ductility to provide a substantially leakproof seal.

It is still an additional object of the present invention to provide a ring seal which provides substantial elastic recovery so that the seal can undergo substantial amounts of cycles, compression and decompression, and still provide a substantially leakproof seal.

It is still another object of the present invention to provide a ring seal which does not form a concentric chamber when compressed to create a seal that exhibits the characteristics of a virtual leak.

Moreover, it is an object of the present invention to provide a ring seal which is simple to manufacture and which can be constructed in a variety of sizes and dimensions.

These and other features and advantages of the present invention will be appreciated by those skilled in the art from the following detailed description taken in conjunction with the drawings.

DETAILED DESCRIPTION OF THE INVENTION

Figure 1:
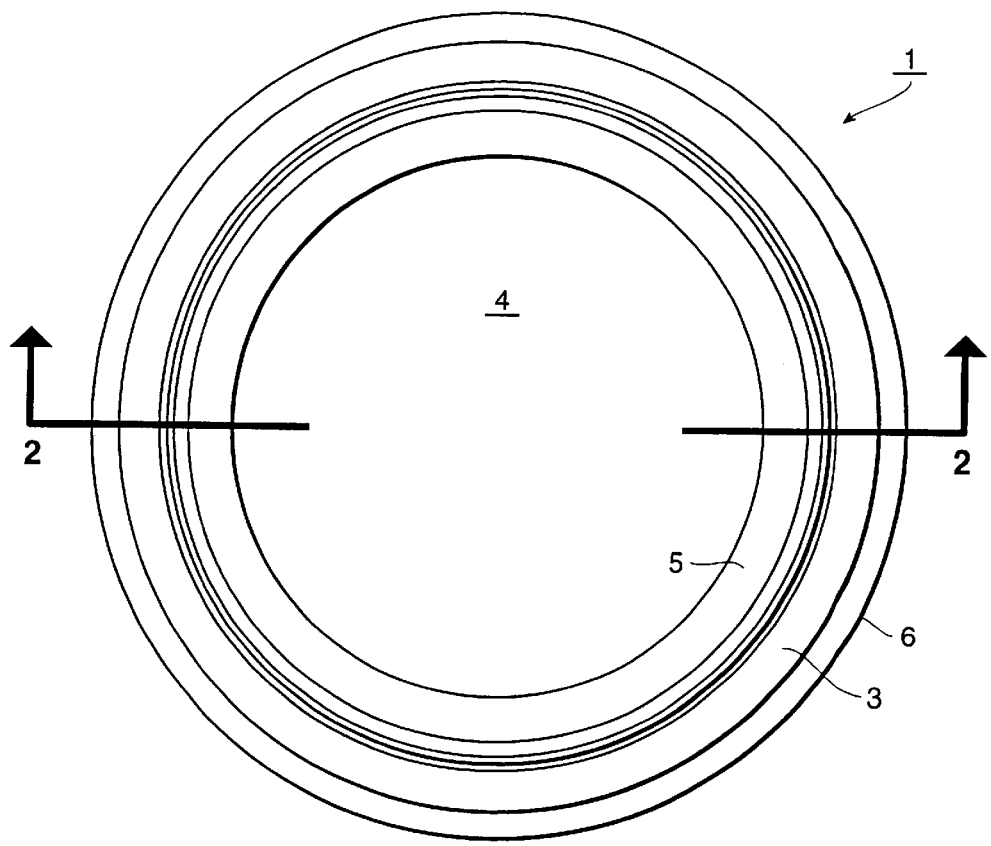
FIG. 1 is an elevational view of the ring seal of the present invention.

While the present invention is susceptible of embodiments in various forms, as shown in the drawings, hereinafter be described the presently preferred embodiments of the invention with the understanding that the present disclosure is to be considered as an exemplification of the invention and it is not intended to limit the invention to the specific embodiments illustrated.

Figure 3:
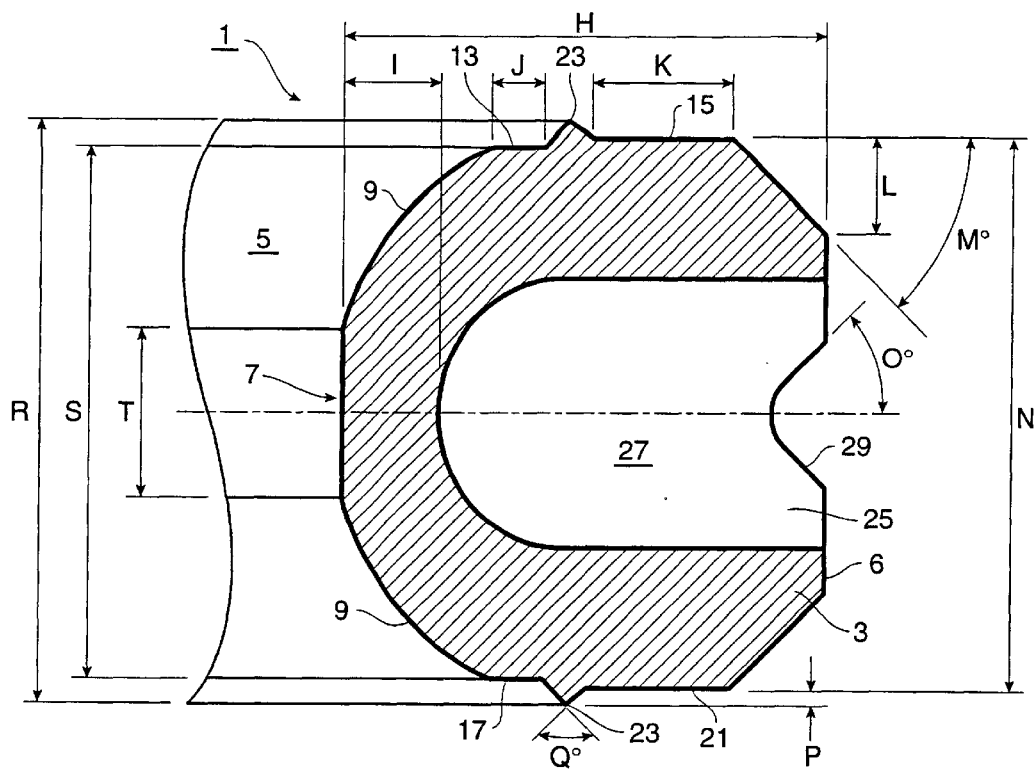
FIG. 3 is an cross-sectional view of the ring seal of the present invention.

As shown in the figures, the ring seal 1 of the present invention includes an annularly shaped body element 3 having an axial aligned center hole 4 for permitting the passage of gases or fluids therethrough. Due to the annular construction of the ring seal 1, the ring seal 1 includes a radial inner surface 5, a radial outer surface 6, a first axial end surface 11 and a second axial end surface 17. Each of these surfaces may take any number of configurations. They may be substantially flat and planar, or substantially curved. For example, as shown in FIG. 3, the radial inner surface 5 includes a flat region 7 and curved regions 9. Similarly, as shown in the figures, the outer radial surface 6 is shown to include a planar surface and an angled abutment. These surfaces may take other forms without departing from the intentions of the present invention.

Figure 8:
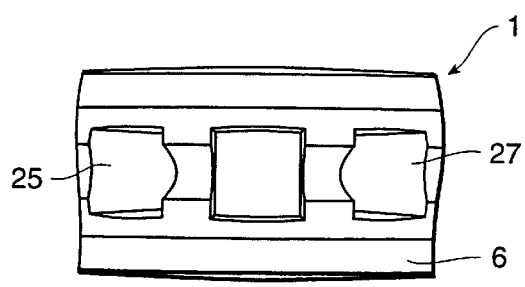
FIG. 8 is a partial side view of the ring seal of the present invention illustrating an embodiment having square cross-sectional shaped bores.
Figure 9:
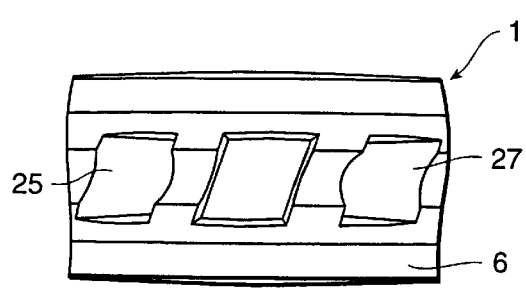
FIG. 9 is a partial side view of the ring seal of the present invention illustrating an embodiment having bores shaped like parallelograms.

The ring seal 1 of the present invention further includes a plurality of bores 25 which project inwardly from the ring seal's radial outer surface 6 towards the ring seal's center hole 4. The formation of the bores 25 creates a plurality of sidewalls 27 which also extend radially from the ring seal's radial outer surface 6, and axially between the ring seal's axial end surfaces 11 and 17. Though the term "bore" is often construed to mean an open projection having a circular cross-section, as used herein "bore" is intended to be construed broadly to include holes of innumerable shaped cross-sections. For example, the bores 25 may have square or rectangular cross-sections such as shown in FIG. 8, or the bores 25 may have cross-sections wherein the sidewalls 27 are planar and angled with respect to the axis of the ring seal 1 thus forming a cross-section in the form of a parallelogram, as shown in FIG. 9. A ring seal 1 having non-axially aligned sidewalls 27 forming bores 25 are believed to be particularly suited where the ring seal 1 requires significant deformation for a particular load. Moreover, though the bores, in general, project axially from the radial outer surface toward the ring seal's center, the bores may project along curved paths toward the ring seal's center or may be angled toward the axial direction without departing from the spirit or scope of the present invention.

Figure 2:
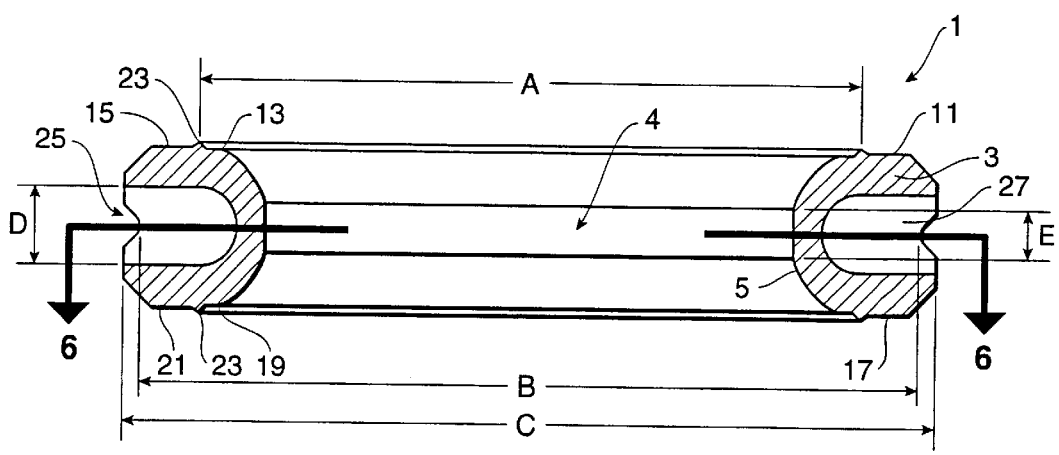
FIG. 2 is a cross-sectional view of the ring seal of the present invention taken along line 2—2 of FIG. 1.
Figure 6:
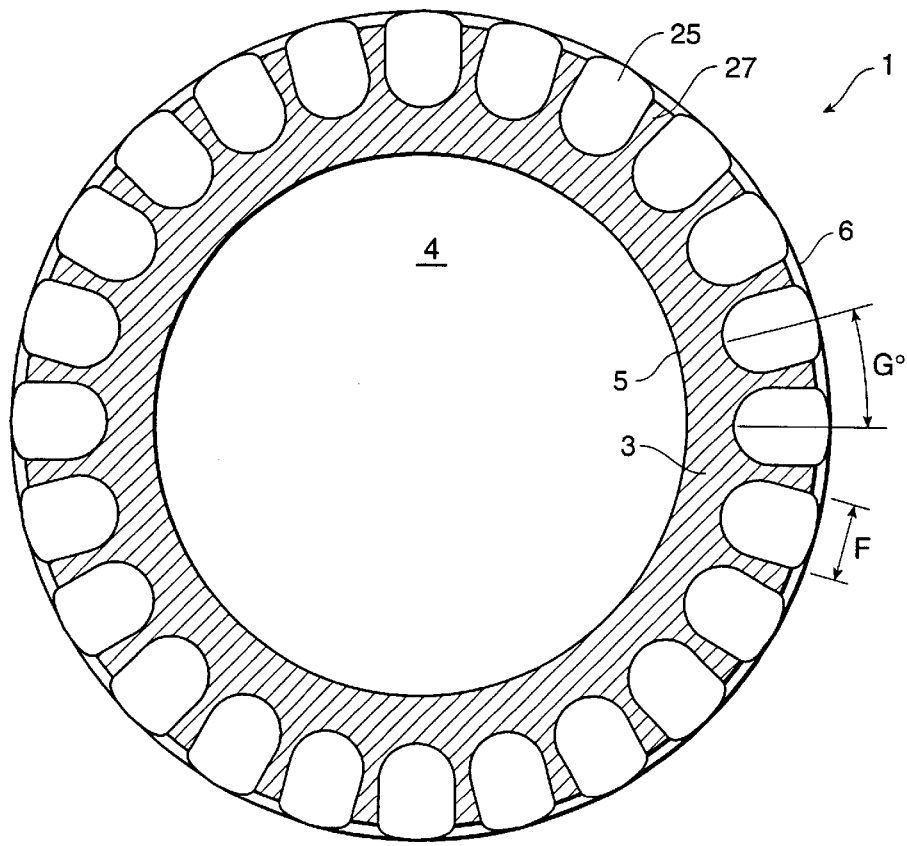
FIG. 6 is a cross-sectional view taken along line 6—6 of FIG. 2.
Figure 7:
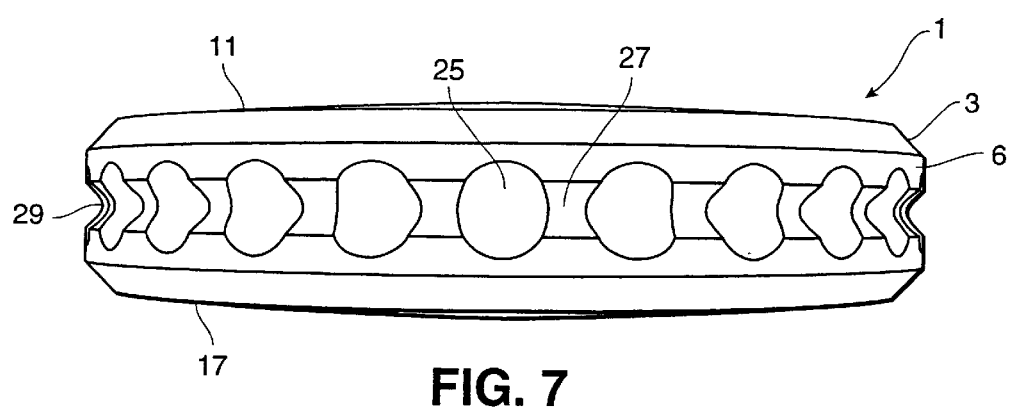
FIG. 7 is a side view of the ring seal of the present invention including cylindrical bores.

Meanwhile, and as shown in FIGS. 2, 3 and 7, in a preferred embodiment the bores 25 are manufactured by drilling radially to form cylindrical bores having circular cross-sections. Bores of this shape are believed to be the least expensive and most simplistic to manufacture. The ring seal 1 of the present invention may include any number of bores 25. However, it is preferred that the ring seal 1 includes sufficient bores 25 to effectively increase the ring seal's plastic deformation under compressive load, but not too many bores that the structural integrity of the ring seal 1 would be jeopardized by reducing the thickness of the sidewalls 27 such that they would be prone to failure under repeated cycling of compression and decompression. In a preferred embodiment, the ring seal 1 includes between ten and one hundred fifty radially aligned bores 25. Even more preferably, the ring seal 1 includes between twenty and thirty bores 25. As shown in FIG. 6, a preferred ring seal 1 includes twenty-four (24) bores.

As explained above, the sidewalls 27 may be of numerous shapes without departing from the spirit and scope of the invention. For example, when the bores 25 are cylindrical in shape having a fixed diameter from their outer extremity near the radial outer surface 6 toward the ring seal's center 4, the sidewalls 27 will have cross-sections which are substantially concave and have a diminishing thickness from the radial outer surface 6 towards the ring seal's center hole 4. Meanwhile, with reference to FIGS. 8 and 9, where the sidewalls 27 are substantially planar and have a fixed thickness along their radial length, it is the bores 25 that will have diminishing cross-sections towards the center of the ring seal 1. Moreover, it is not imperative that the sidewall 27 extend the entire length of the bore 25. For example, as shown in FIGS. 2, 3 and 7, the sidewalls 27 may include an indent 29. The indent 29 is provided for enabling the ring seal 1 to be inserted into a keeper (not shown). A keeper is a substantially planar sheet having one or more holes dimensioned for receipt of the sidewall indent 29 of a ring seal 1. As is understood by those skilled in the art, and with reference to FIG. 10, it is easier to place one or more ring seals in proper alignment and position between two opposed planar surfaces 31 by placing a keeper including one or more ring seals between the opposed parallel planar surfaces 31 prior to compression of the ring seal 1.

Figure 4:
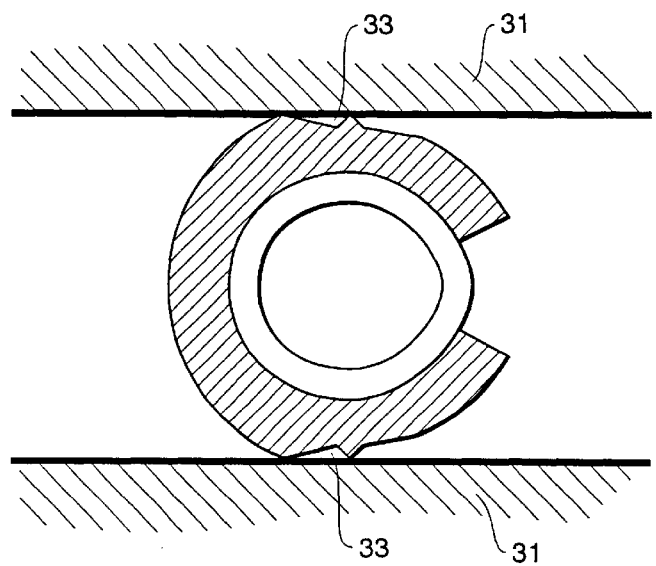
FIG. 4 is an exaggerated cross-sectional illustration of a ring seal of the prior art shown in compression.

With reference to FIG. 4, prior art C seals typically include a circular ridge on their axial end surfaces. When the C seal is compressed to form a sealing joint, the open end of the C seal has a tendency to close due to compression on the circular ridges and increased stiffness on the closed side of the C seal. When this occurs, it is common for the point where the axial end surfaces intersect with the radial inner surface 5 to also engage the opposed planar surfaces 31. Though the C seal may form a perfectly leakproof seal, unfortunately a chamber 33 is formed which may receive gases or fluids from the center of the seal, and which may later leak these contents back into the center of the seal. FIG. 4 shows cross-sectional view of the chamber 33 which has been exaggerated to show its location. In reality, the circular ridges 23 are typically only a few thousandth of an inch high and they undergo significant plastic deformation when the seal is compressed. As a result, the chamber 33 would scarcely be visible to the human eye. However, a ring seal chamber 33 can store and transmit gases or fluids to the center of the seal which can be very troublesome as this can reflect a leak in the seal where one has in fact not occurred. Advantageously, in a preferred embodiment, the ring seal 1 of the present invention eliminates this "virtual leak".

Figure 5:
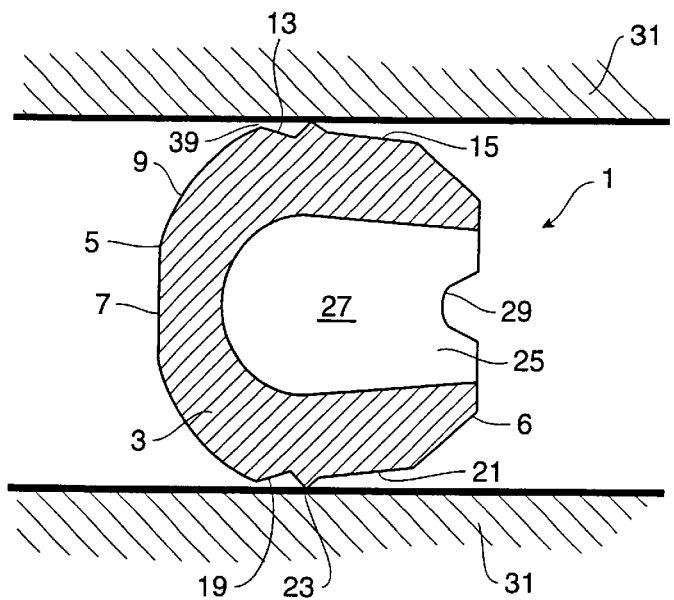
FIG. 5 is an exaggerated cross-sectional view of the ring seal of the present invention shown in compression.
Figure 10:
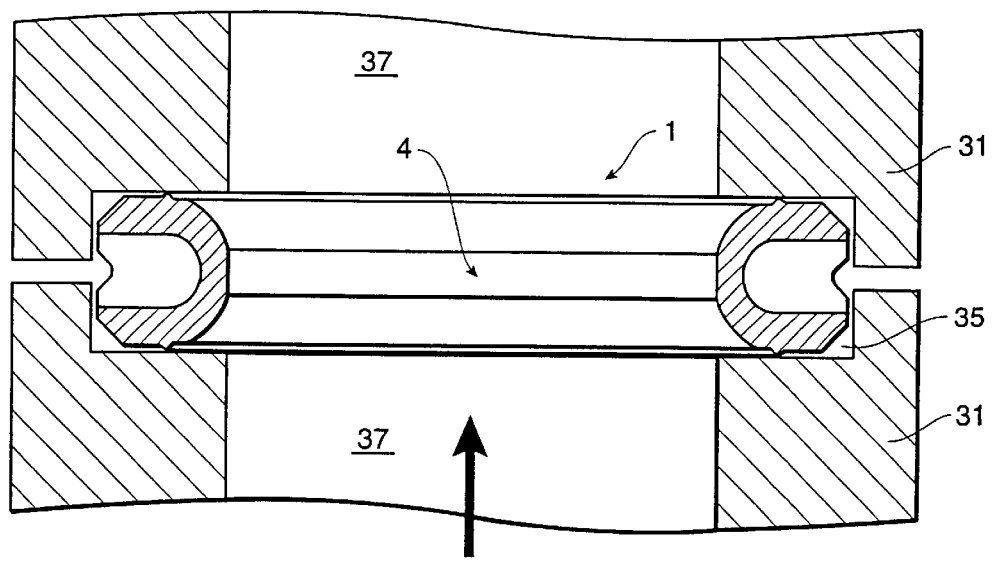
FIG. 10 is a cross-sectional side view of the ring seal of the present invention illustrating its operation as a seal between two opposed parallel surfaces having an axial conduit.

As shown in FIGS. 3, 5 and 10, the ring seal 1 of the present invention includes a circular ridge 23 which projects axially from the axial end surfaces 11 and 17. The ridge 23 divides the first axial end surface 11 into a first inner axial end surface 13 and a first outer axial end surface 15. Similarly, the ridge 23 which projects from the second axial end surface 17 divides that axial end surface into a second inner axial end surface 19 and a second outer axial end surface 21. It is an object of the present invention that the inner axial end surfaces 13 and 19 be recessed inwardly with respect to the outer axial end surfaces 15 and 21 to produce an offset. As shown in FIG. 5, the thickness of the ring seal 1 as measured at the inner axially end surfaces 13 and 19 is thinner than the thickness of the ring seal 1 as measured at the outer axial end surfaces 15 and 21. This offset permits a space 39 to be maintained between the inner axial end surfaces 13 and 19 and the opposed parallel planar surfaces 31. This gap permits an increased load to be imparted on ridges 23 which increases deformation of the ridge during sealing, and thus enhances the likelihood that a leakproof seal is obtained. Moreover, the gap also insures that a chamber 33 is not formed between the inner axial end surfaces 13 and 19 and the opposed planar surfaces 31 which could create a "virtual leak".

The offset between the outer axial end surfaces 15 and 21 and the inner axial end surfaces 13 and 19 may be any distance which is required to ensure that a virtual leak does not occur. This distance may vary depending on the ring seal's material, the height of the ridge 23, the compressive forces imparted by the opposed parallel planar surfaces 31 on the sealing assembly, the number and diameter of bores 25, the depth of the bores 25, the thicknesses of the sidewalls 27, the lengths of the sidewalls 27, etc. In a preferred embodiment, the offset is at least 0.001 inches.

The ring seal 1 of the present invention may take a variety of different constructions without departing from the spirit and scope of the invention. With reference to FIGS. 2, 3 and 6, the dimensions of a presently preferred ring seal 1, particularly suited for extremely low leak rates, is provided below.

| | Dimensions/Degrees |
|---|---|
| A | 0.228 ± 0.002 |
| B | 0.268–0.271 |
| C | 0.282 ± 0.002 |
| D | 0.028 ± 0.002 |
| E | 0.017 |
| F | 0.028 ± 0.002 |
| G | 15° |
| H | 0.051 |
| I | 0.010 ± 0.002 |
| J | 0.005 |
| K | 0.015 |
| L | 0.010 ± 0.002 |
| M | 45° |
| N | 0.057 |
| O | 45° |
| P | 0.002–0.0025 |
| Q | 90° |
| R | 0.060–0.062 |
| S | 0.055 |
| T | 0.017 |

The ring seal 1 may be manufactured of any material suitable for sealing applications. However, it is preferred that the ring seal 1 be manufactured of a metal such as aluminum, copper, silver, nickel, steel or alloys such as hastelloy. In a preferred embodiment, the ring seal 1 is manufactured of stainless steel. However, the ring seal 1 may be manufactured of other materials including elastomers without departing from the spirit and scope of the invention.

Having described the invention in such terms to enable those skilled in the art to make and use it, and having identified the presently best mode of practicing it.

I claim:

1. A ring seal adapted to be compressed and decompressed in the axial direction for making a sealed joint between first and second axially opposed substantially parallel surfaces, said ring seal constructed of a stiffly flexible material and comprising:

an annularly shaped body element having an axially aligned hole for gas or fluid passage;

a radial inner surface;

a radial outer surface;

first and second axial end surfaces intended to be positioned adjacent to the axially opposed substantially parallel surfaces;

a first circular ridge projecting axially from first axial end surface which divides said first axial end surface into a first inner axial end surface and first outer axial end surface;

said first circular ridge constructed to project outwardly from said first axial end surface so that when said ring seal is positioned to form a sealed joint between the opposed substantially parallel surfaces, said circular ridge engages the opposed substantially parallel surfaces and a gap is retained between the first axial end surfaces and the axially opposed substantially parallel surfaces;

said ring seal being constructed with the region of said first inner axial end surface adjacent to said first circular ridge projecting axially inward more than the region of said first outer axial end surface adjacent to said first circular ridge to reduce the propensity of the ring seal forming a chamber storing a gas or liquid at said first inner axial end surface which could develop a virtual leak.

2. A ring seal of claim 1 further comprising:

a second circular ridge projecting axially from second axial end surface which divides said second axial end surface into a second inner axial end surface and second outer axial end surface;

said second circular ridge constructed to project outwardly from said second axial end surface so that when said ring seal is positioned to form a sealed joint between opposed substantially parallel surfaces, said circular ridge engages the opposed substantially parallel surfaces and a gap is retained between the second axial end surfaces and the axially opposed substantially parallel surfaces;

said ring seal being constructed with the region of said second inner axial end surface adjacent to said second circular ridge projecting axially inward more than the region of said second outer axial end surface adjacent to said second circular ridge to reduce the propensity of the ring seal forming a chamber storing a gas or liquid at said second inner axial end surface which could develop a virtual leak.

3. A ring seal adapted to be compressed and decompressed in the axial direction for making a sealed joint between first and second axially opposed substantially parallel surfaces, said ring seal constructed of a stiffly flexible material and comprising:

an annularly shaped body element having an axially aligned hole for gas or fluid passage;

a radial inner surface;

a radial outer surface;

first and second axial end surfaces intended to be positioned adjacent to the axially opposed substantially parallel surfaces;

a first circular ridge projecting axially from first axial end surface which divides said first axial end surface into a first inner axial end surface and first outer axial end surface;

a second circular ridge projecting axially from second axial end surface which divides said second axial end surface into a second inner axial end surface and a second outer axial end surface;

said circular ridges constructed to project outwardly from said axial end surfaces so that when said ring seal is positioned to form a sealed joint between the opposed substantially parallel surfaces, said circular ridges engage the opposed substantially parallel surfaces and a gap is retained between said axial end surfaces and the opposed substantially parallel surfaces;

said ring seal being constructed thinner axially at said inner axial end surfaces adjacent to said circular ridges than at said outer axial end surfaces adjacent to said circular ridges to reduce the propensity of the ring seal forming a chamber storing a gas or liquid which could develop a virtual leak.

* * * * *